(12) United States Patent
Bruner

(10) Patent No.: US 6,529,748 B1
(45) Date of Patent: Mar. 4, 2003

(54) BILATERAL POWER MANAGEMENT SYSTEM

(75) Inventor: John David Bruner, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/408,643

(22) Filed: Sep. 30, 1999

(51) Int. Cl.[7] ................................................. H04B 1/38

(52) U.S. Cl. ........................ 455/574; 455/552; 455/343; 340/232; 395/800.35

(58) Field of Search ................................ 455/343, 574, 455/552; 340/232; 395/800.35

(56) References Cited

U.S. PATENT DOCUMENTS 6,002,882 A * 12/1999 Garde .................. 395/800.35

* cited by examiner

Primary Examiner—William Trost
Assistant Examiner—Danh Le
(74) Attorney, Agent, or Firm—Lalita P. Williams

(57) ABSTRACT

Method and apparatus for transmitting handshaking signals between two peer devices using only two signal lines. The apparatus is symmetrical in that either peer device uses substantially the same signals and logic states to rouse the other. Only two handshaking signals are defined, but each handshaking signal has a dual meaning that is determined by various intermediate logic states in each peer device. Thus, the same signal that is generated by peer device A and sent to peer device B to tell peer device B that peer device A is awake and ready to receive a data transmission, is also generated by peer device A and transmitted to peer device B to request peer device B to wake up.

11 Claims, 3 Drawing Sheets

BILATERAL POWER MANAGEMENT SYSTEM

BACKGROUND OF THE INVENTION

A. Field of the Invention

The present invention relates in general to power management, and more particularly, to a method and apparatus for regulating the power consumption of a portable battery-operated electronic device. The present invention has particular application to portable radiotelephones used to communicate with terrestrial cellular or satellite wireless telephony systems.

B. Description of Relevant Art

In a portable battery operated electronic device, such as a radiotelephone, aggressive power management is needed in order to maximize battery-life. A common method of managing (more specifically, reducing) power consumption is to periodically place the subject device into a reduced functionality/power state. This reduced functionality/power state is generally referred to as "sleep mode." The device is typically roused from its reduced power state by an external event such as a timer or an external interrupt. Often the device can be placed in a number of reduced power states/levels, ranging from full-on to full-off. In the lower power states, however, very few external interrupt sources are still enabled.

The hardware components of a portable electronic device may be segregated and packaged as separate modular units that communicate with one another in carrying out the overall hardware functionality of the device. An electronic device that has more than one modular unit will typically have one or more communication paths between the modules. If the modules are relatively sophisticated components (e.g., where each module has its own microprocessor), each module can control its own power management states. However, some coordination between the modules is necessary to ensure correct operation of each module, as well as maximum total power savings. And, if communication between a given pair of modules can be initiated by either module, then each module must have the capability to rouse the other from a deep sleep state. In the deepest sleep state, the normal communications channels between modules are most likely shut down, thus requiring another mechanism by which one module can rouse another.

A specific example of a modular portable battery operated electronic device of the type described above is Motorola's Satellite Series 9500 Portable Telephone for use on the Iridium System (hereinafter "multi-mode phone"). The primary modular component of the multi-mode phone is its base phone unit, which provides the main communication conduit between the user and the satellite-based telephony system. Various cellular cassette modules may be plugged into the base phone unit, with each cellular cassette module providing a communication conduit to a particular cellular system. For example a particular plug-in cassette is available that follows U.S. cellular standards, while another different plug-in cassette is available that follows European cellular standards. The base phone unit is essentially a complete radiotelephone including microprocessor, display, microphone, speakers and keypad. Each cellular cassette is also a substantially complete radiotelephone having the essentially the same components as the base phone unit minus the display and key pad.

Accordingly, as both the base phone unit and the cellular cassette are fairly sophisticated devices, both can consume a considerable amount of power. Thus, the multi-mode phone must employ power management strategies to reduce the amount of power consumed. Stated simply, when the multi-mode phone is not doing anything, it must go into a low power state, and, when it subsequently needs to do something, it must be aroused from its low power state. Facilitating power management is more straightforward in a conventional cellular phone that is controlled by a single microprocessor and does not have the modular cassette structure of a multi-mode phone. However, as typical multi-mode phones have two relatively sophisticated modules each having its own microprocessor, implementing power management becomes more complicated. More particularly, because the two modules in a multi-mode phone often need to talk to one another, there is a need to coordinate "sleep states" between the base phone module and the cellular cassette module so one can awaken the other prior to sending a communication from one to the other. For example, if both the base phone and the cellular cassette are in a sleep state, and a cellular call comes into the cellular cassette, the cellular cassette needs to be able to rouse the base phone from its sleep state in order to process the cellular call. Also, the base phone unit must be able to rouse the cellular cassette from its sleep state when there user attempts to place a cellular call.

In normal operation, the base phone and the cellular cassette communicate with one another through an asynchronous serial interface. However, the asynchronous serial interface is typically disabled when the base phone and/or the cellular cassette is in its lowest power saving state (other than the "off" state). Accordingly, another pathway for communicating so-called "wake up" signals between the modules is needed. A straightforward implementation is to provide handshaking wire connections between the modules that are dedicated to passing wake-up signals between the modules.

In general, there is a need to pass four signals between the modules. Each module must be able to send a "wake up" signal to the other module. Each module must also be able to send an "awake" signal to the other module in response to having received a wake up signal. This would require four handshaking connections/lines between the modules. An example of a handshaking protocol that uses four handshaking signals transmitted across four connections/lines for modem related operations is the RTS/CTS handshaking described in the EIA RS-232C specification.

As applied to modular portable radiotelephone devices, cost and size benefits may be realized by reducing the number connections/lines between the device's modules. Accordingly, cost and size benefits may be achieved by providing a handshaking protocol that requires fewer handshaking connections/lines.

SUMMARY OF THE INVENTION

The present invention provides a method and apparatus that generates and transmits handshaking signals between two peer devices using relatively few transmission lines. A device and method embodying the present invention includes an apparatus that controls power management for two devices. The apparatus includes a first module/device having a controller that controls power management protocols for the first device, the first devices's power management protocols including at least one reduced power state. The apparatus further includes a second module/device having a controller that controls power management protocols for the second device, the second device's power management protocols including at least one reduced power state.

No more than two handshaking signal lines are connected between the first device and the second device. The handshaking signal lines include a first handshaking signal line that carries a first handshaking signal from said first device to said second device, along with a second handshaking signal line that carries a second handshaking signal from said second device to said first device. The first device's power management protocols generate said first handshaking signal, and the second device's power management protocols generate said second handshaking signal.

The first handshaking signal, when received by said second device at a predetermined time, commands said second device to come out of its at least one reduced power state, and the first handshaking signal, when received by said second device in another predetermined sequence, also informs said second device that said first device is out of its at least one reduced power state.

The second handshaking signal, when received by said first device as part of a predetermined sequence, commands said first device to come out of its at least one reduced power state, and the second handshaking signal, when received by said first device as part of another predetermined sequence, also informs said first device that said second device is out of its reduced power state.

The above-described apparatus may also include data signal lines connecting said first device to said second device. The first handshaking signal is determined based on the state of various events, and on the state of various signals. The second handshaking signal may also be determined based on the state of various events, and on the state of various signals.

The invention itself, together with further objects and attendant advantages, will best be understood by reference to the following detailed description, taken in conjunction with the accompanying drawings.

DESCRIPTION OF THE PREFERRED EMBODIMENT

By way of example only, the method and apparatus of the present invention are disclosed in connection with a portable radiotelephone system wherein the radiotelephone includes at least two relatively intelligent peer components that each use power management techniques. It should be understood, however, that any system requiring the transfer of data files or any other information between peer components that require some handshaking prior to data transfer may employ the techniques shown herein.

Figure 1:
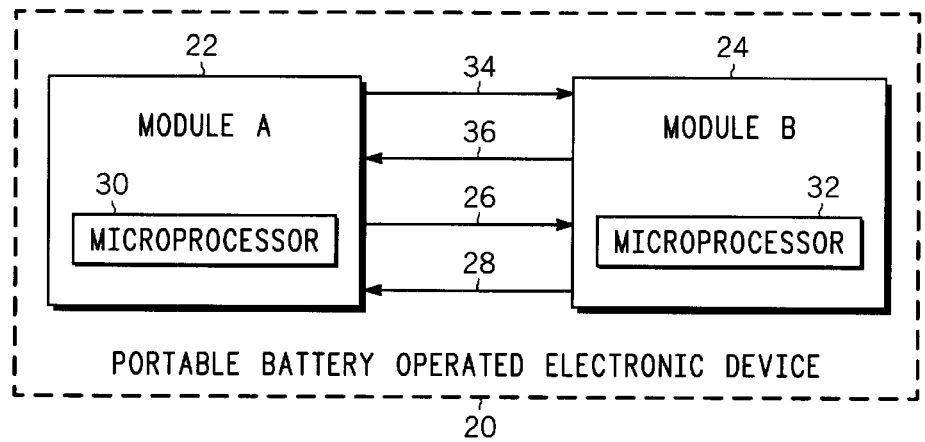
FIG. 1 is a block diagram representation of a portable battery operated electronic device embodying the present invention.

FIG. 1 is a general diagram of a portable battery-operated electronic device 20 embodying the present invention. The device 20 is primarily characterized by at least two peer components/modules 22, 24 that pass data and other communications back and forth along data lines 26, 28. Each peer module includes its own microprocessor 30, 32, respectively, and each microprocessor 30, 32 runs and controls power management protocols for its associated peer module. In general, the power management protocols place its associated peer module into a reduced power (or "sleep") mode when the peer module is inactive, and also awakens its own and/or the other peer module when there is a request for some activity from one or both of the peer modules. Handshaking signals that must be exchanged between the peer modules 22, 24 when, for example, there is a need for one peer to rouse the other from its sleep state, are transmitted along handshaking lines 34, 36. In particular, handshaking signals from the first peer module 22 to the second peer module 24 are transmitted along a first handshaking line 34, while handshaking signals from the second peer module 24 to the first peer module 22 are transmitted along a second handshaking line 36. An important feature of the present invention is that power management related handshaking communications between the peer modules 22, 24 may be accomplished using only two handshaking connections, namely first and second handshaking lines 34, 36. This is accomplished, inter alia, by requiring the transmission of only two handshaking signals, one sent from the first peer module 22 to the second peer module 24 along handshaking line 34, and a second sent from the second peer module 24 to the first peer module 22 along handshaking line 36. Because each peer module must be able to communicate two handshaking related "states" (i.e., a "wakeup" request and an "awake" confirmation) but has only one handshaking line to do so, the present invention provides a single handshaking signal that has dual meaning. In other words, the first peer module 22 always outputs the same handshaking signal on the same handshaking line 34 regardless of whether it is issuing a wakeup request to the second peer module 24 or responding to a wakeup request received from the second peer module 24. Similarly, the second peer module 24 always outputs the same handshaking signal on the same handshaking line 36 regardless of whether it is issuing a wakeup request to the first peer module 22 or responding to a wakeup request received from the first peer module 22. However, this same handshaking signal communicates either a "wakeup" request or an "awake" confirmation depending upon internal logic states that are present in the sending/receiving peer module. These internal logic states are selected internal variables/states in each module that are combined to represent generally the awake or sleep state of the associated module. Accordingly, the internal logic states are logically "overlaid" on the single handshaking signal to communicate either a wakeup request or an awake confirmation depending upon status of the aforementioned logic states or variables.

For example, assume that the first and second peer devices 22, 24 are both in deep sleep modes. An external event rouses the first peer device 22 from its sleep state and requests the first peer module 22 to perform a task. The requested task involves the second peer module 24 and therefore the first peer module 22 must rouse the second peer module 24 from its sleep state. The first peer module 22 therefore analyzes its internal logic states and generates the appropriate wakeup signal to the second peer module 24.

Figure 2:
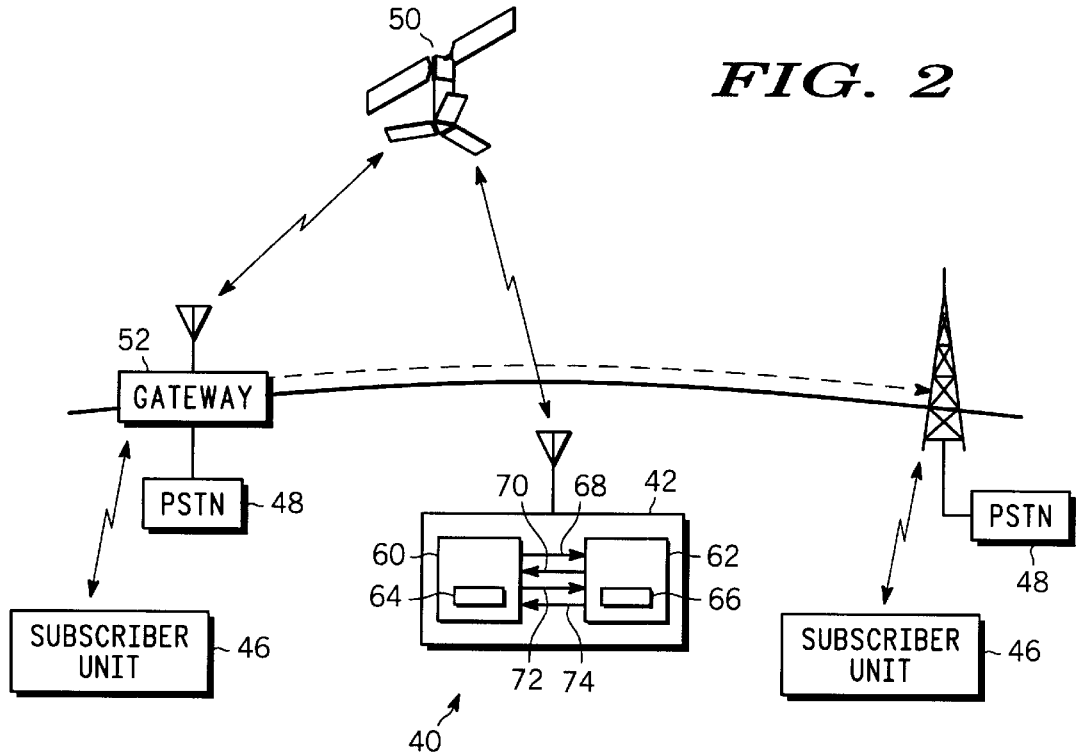
FIG. 2 is another block diagram representation of a battery-operated radiotelephone and associated communication system also embodying the present invention.

FIG. 2 is another block diagram representation of a battery-operated radiotelephone 42 and an associated telephony communication system 40 also embodying the present invention. FIG. 2 is related to FIG. 1 in that the radiotelephone 42 of FIG. 2 is a more specific example of the portable battery-operated electronic device 20 shown in FIG. 1. As shown in FIG. 2, the communication system 40 includes both satellite and cellular components. Although single components are depicted, for example, one satellite 50, one radiotelephone 42, one base station 44, etc., it should be understood that the communication system 40 as implemented may includes several such components.

Referring still to FIG. 2, the radiotelephone 42 communicates with the terrestrial cellular system via the base station 44. The base station 44 provides access to other subscriber units 46 and the public switched telephone network (PSTN) 48. The radiotelephone 42 communicates with the satellite telephony system via a satellite 50 and a gateway 52. The gateway 52 provides a communication link to the PSTN 48, the base station 44 and other subscribers 46.

Similar to the device 20 shown in FIG. 1, the radiotelephone 42 of FIG. 2 includes, inter alia, two peer modules 60, 62 that each performs its own power management functions in addition to communicating data back and forth to the other peer module. The multi-mode radiotelephone 42 is a diagrammatic representation of Motorola's Satellite Series 9500 Portable Telephone for use on the Iridium System (hereinafter "mult-mode phone"). The primary modular component of the radiotelephone 42 is its base phone unit 60, which acts as the first peer module and provides the main communication conduit between the user and the satellite-based telephony system. A so-called cellular cassette module 62, which may be plugged into the base phone unit 60, acts as the second peer module. The cellular cassette module 62 provides a communication conduit to a particular cellular system. For example a particular plug-in cassette is available that follows U.S. cellular standards, while another different plug-in cassette is available that follows European cellular standards. The base phone unit 60 is essentially a complete radiotelephone including microprocessor, display, microphone, speakers and keypad. Each plug-in cellular cassette 62 is also a substantially complete radiotelephone having the essentially the same components as the base phone unit 60 minus the display and key pad.

Each peer module 60, 62 includes its own microprocessor 64, 66, respectively, and each microprocessor 64, 66 runs and controls power management protocols for its associated peer module. In general, the power management protocols place its associated peer module into a reduced power (or "sleep) mode when the peer module is inactive, and also awakens its own and/or the other peer module when there is a request for some activity from one or both of the peer modules. Handshaking signals that must be exchanged between the peer modules 60,62 when, for example, there is a need for one peer to rouse the other from its sleep state, are transmitted along handshaking lines 68, 70. In particular, handshaking signals from the base phone module 60 to the cellular cassette module 62 are transmitted along a first handshaking line 68, while handshaking signals from the cellular cassette module 62 to the base phone module 60 are transmitted along a second handshaking line 70. Data is transferred between the modules 60, 62 along data lines 72, 74. The data lines 72, 74 are preferably asynchronous.

As described above in connection with FIG. 1, an important feature of the present invention is that power management related handshaking communications between the peer modules 60, 62 may be accomplished using only two handshaking connections, namely first and second handshaking lines 68, 70. This is accomplished, inter alia, by requiring the transmission of only two handshaking signals, one sent from the base phone modular 60 to the cellular cassette 62 along handshaking line 68, and another sent from the cellular cassette 62 to the base phone module 60 along handshaking line 70. Because each peer module must be able to communicate two handshaking related "states" (i.e., a "wakeup" request and an "awake" confirmation) but has only one handshaking line to do so, the present invention provides a single handshaking signal that has dual meaning. In other words, the base phone module 60 always outputs the same handshaking signal on the same handshaking line 68 regardless of whether it is issuing a wakeup request to the cellular cassette module 62 or responding to a wakeup request received from the cellular cassette module 62. Similarly, the cellular cassette module 62 always outputs the same handshaking signal on the same handshaking line 70 regardless of whether it is issuing a wakeup request to the base phone module 60 or responding to a wakeup request received from the cellular cassette module 62. However, this same handshaking signal communicates either a "wakeup" request or an "awake" confirmation depending upon internal logic states that are present in the sending/receiving peer module. These internal logic states are selected internal variables/states in each module that are combined to represent generally the awake or sleep state of the associated module.

Accordingly, the internal logic states are logically "overlaid" on the single handshaking signal to communicate either a wakeup request or an awake confirmation depending upon status of the aforementioned logic states or variables.

FIGS. 3–7 are graphs illustrating some of the internal logic states that are used to generate the dual function, wakeup/awake signals embodying the present invention. Unfortunately, only two hardware signals are provided for power management handshaking. The present invention solves this problem by having the separate functions of requesting permission to transmit (wakeup request) and acknowledging the request from the other entity overlaid upon one pair of signals. The handshaking is fully symmetrical, i.e., the base phone 60 and the cellular cassette 62 behave the same way except for the specific hardware signals that they send/receive.

Figure 3:
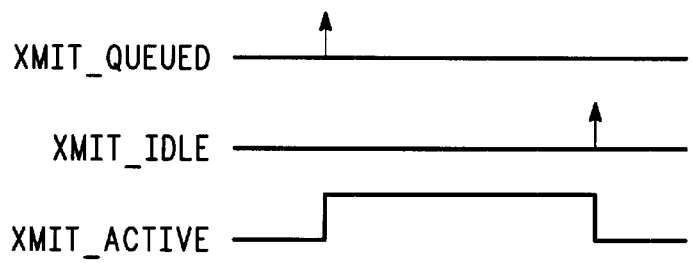
FIG. 3 is graph illustrating some of the internal logic states that are used to generate the dual function, wakeup/awake signals embodying the present invention.
Figure 4:
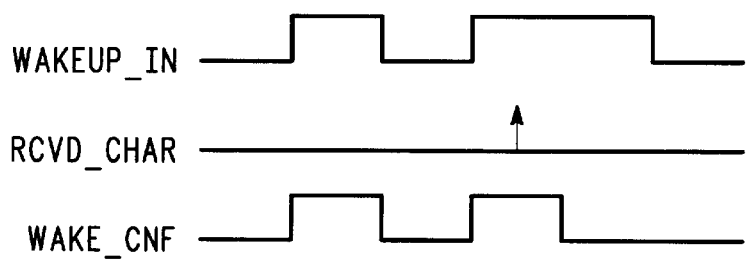
FIG. 4 is another graph illustrating some of the internal logic states that are used to generate the dual function, wakeup/awake signals embodying the present invention.
Figure 5:
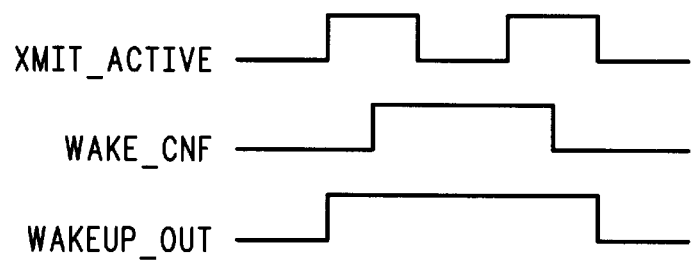
FIG. 5 is another graph illustrating some of the internal logic states that are used to generate the dual function, wakeup/awake signals embodying the present invention.
Figure 6:
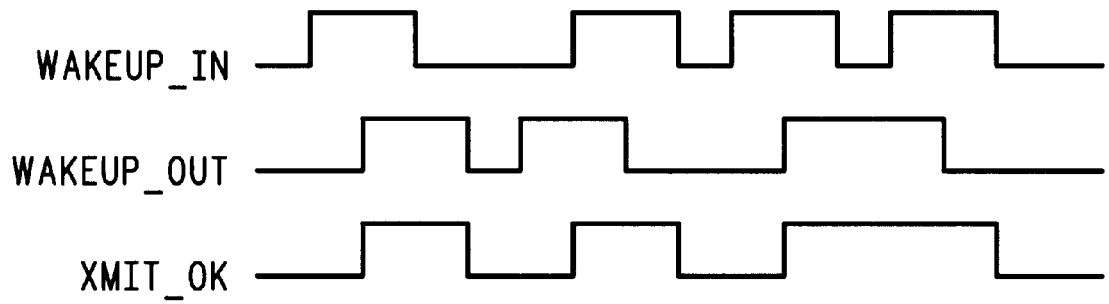
FIG. 6 is another graph illustrating some of the internal logic states that are used to generate the dual function, wakeup/awake signals embodying the present invention.
Figure 7:
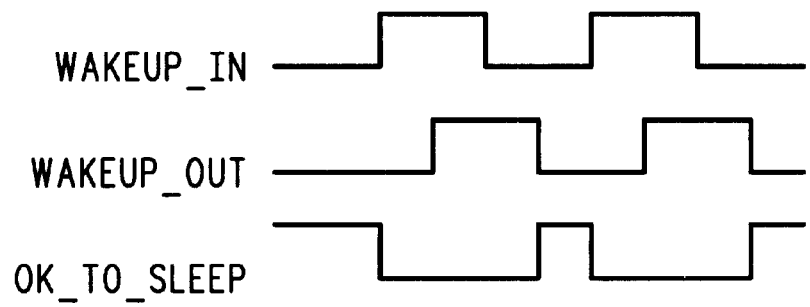
FIG. 7 is another graph illustrating some of the internal logic states that are used to generate the dual function, wakeup/awake signals embodying the present invention.

The following description, taken in conjunction with the timing graphs shown in FIGS. 3–7, define the handshaking in terms of events and software signals, then describes the mapping between these software entities and the physical handshaking signals. In general, FIG. 3 illustrates the generation of XMIT_ACTIVE from XMIT_QUEUED and XMIT_IDLE. FIG. 4 illustrates the generation of WAKE_CNF from WAKEUP_IN and RCVD_CHAR. FIG. 5 illustrates the generation of WAKEUP_OUT from XMIT_ACTIVE and WAKE_CNF. FIG. 6 illustrates the generation of XMIT_OK from WAKEUP_IN and WAKEUP_OUT. FIG. 7 illustrates the generation of OK_TO_SLEEP from WAKEUP_IN (aka, SU_WAKEUP) and WAKEUP_OUT (aka, TRC_WAKEUP). The acronyms SU and TRC represent the "subscriber unit" (i.e., the base phone) and the "terrestrial radio cassette" (i.e., the cellular cassette). Events are characterized only by their occurrence (they can be viewed as delta functions or very short pulses). By contrast, signals possess a persistent state, either asserted or negated.

For convenience, all software signals are considered "active high." The software signals exist for descriptive purposes only-an implementation need not implement any of them directly, provided that the same behavior of the hardware signals is achieved.

In the definition that follows, the transmit request function is represented by the logical condition XMIT_ACTIVE and the acknowledgment function is represented by the logical condition WAKE_CNF. These two are ORed together to create the output wakeup signal. Transmission cannot begin until the wakeup request is acknowledged, a condition represented by the signal XMIT_OK. Low-power mode can only be entered when no transmission or handshake is in progress, represented by OK_TO_SLEEP.

There are generally three input events that are used by the method of the present invention. The XMIT_QUEUED event occurs when data is enqueued for transmission across the serial interface, e.g., when transmission of an RSLIP data packet or signal is ready to begin. The XMIT_IDLE event occurs when the serial interface completes the transmission of a character and goes idle. This corresponds to a transmitter shift register empty interrupt when there is no more data to be sent. The RCVD_CHAR event occurs when a character is received on the serial interface. This corresponds to the occurrence of a receiver interrupt.

There are two input signals, which are the actual dual function handshaking signals. On the base phone module 60, WAKEUP_IN is the active-high equivalent of SU_WAKEUP. On the cellular cassette 62, WAKEUP_IN is the active-high equivalent of TRC-WAKEUP.

There are generally three additional output signals that are not transmitted on the handshaking lines 68, 70. XMIT_ACTIVE indicates that the base phone module 60 (or cellular cassette 62) is either preparing to transmit or is transmitting. It is asserted when XMIT_QUEUED occurs and negated when XMIT_IDLE occurs, as depicted by FIG. 3. WAKE_CNF is a signal that the base phone module 60 (or the cellular cassette 62) asserts to acknowledge the WAKEUP_IN signal it received from the other side. In other words, on the base phone module 60, this signal acknowledges a wakeup request from the cellular cassette 62, and on the cellular cassette 62 it acknowledges a wakeup request from the base phone module 60. WAKE_CNF is asserted on the rising edge of WAKEUP_IN and negated no sooner than either the falling edge Of WAKEUP_IN or when RCVD_CHAR occurs. The intent is that the signal remain asserted long enough for it to be recognized by the other end. The implementation is free to leave WAKE_CNF asserted for much longer if it desires. The trade-off is that leaving it asserted longer will reduce the number of handshaking-related interrupts, and the overhead they entail. However, it may also keep the base phone module 60 or the cellular cassette 62 from entering sleep mode when otherwise it would be able to do so. WAKEUP_OUT is asserted whenever either XMIT_ACTIVE or WAKE_CNF is asserted (i.e., the logical OR of these two signals), as shown in FIG. 5.

On the base phone module 60, the physical signal TRC_WAKEUP is the active low equivalent of WAKEUP_OUT. On the cellular cassette module, the physical signal SU_WAKEUP is the active-low equivalent of WAKEUP_OUT. XMIT_OK is a signal that indicates that it is ok for the base phone (or the cellular cassette) to transmit. It is OK to transmit when the opposite end of the base phone interface is known to be awake.

The base phone 60 (or the cellular cassette 62) will not transmit unless XMIT_OK is asserted.

XMIT_OK becomes asserted (goes high) when both WAKEUP_IN and WAKEUP_OUT are asserted (when both are high). It remains asserted as long as one of WAKEUP_IN or WAKEUP_OUT are asserted. It becomes negated (goes low) when both WAKEUP_IN and WAKEUP_OUT are negated (low). It then remains negated until both WAKEUP_IN and WAKEUP_OUT are once again simultaneously high. It is OK to transmit as long as one of these signals remains asserted, because the other end cannot be asleep (See FIG. 6).

The OK_TO_SLEEP signal indicates whether the phone may enter the low-power stopped state in which most of the interface signals (such as the serial clocks) are disabled. The lowest power state will not be entered unless this signal is asserted. It is asserted only when both WAKEUP_IN and WAKEUP_OUT are negated (See FIG. 7).

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. An apparatus that controls power management comprising:
   a first device having a controller that controls power management protocols for said first device, said first devices's power management protocols comprising at least one reduced power state;
   said first device's power management protocols generating a first handshaking signal;
   no more than one handshaking signal line carrying said first handshaking signal from said first device;
   said first handshaking signal, when generated at a predetermined time, commanding a second device to come out of its at least one reduced power state; and
   said same first handshaking signal, when generated at another predetermined time, informing said second device that said first device is out of its at least one reduced power state.

2. The apparatus of claim 1 further comprising:
   said second device having a controller that controls power management protocols for said second device, said second device's power management protocols comprising said at least one reduced power state;
   said second device's power management protocols generating a second handshaking signal;
   no more than one handshaking signal line carrying said second handshaking signal from said second device;
   said second handshaking signal, when received by said first device as part of a predetermined sequence, commanding said first device to come out of its at least one reduced power state; and
   said second handshaking signal, when received by said first device as part of another predetermined sequence, informing said first device that said second device is out of its reduced power state.

3. The apparatus of claim 2 wherein:
   data signal lines connect said first device to said second device; and
   said first handshaking signal is determined based on the state of various events, and on the state of various signals.

4. The apparatus of claim 3 wherein said second handshaking signal is determined based on the state of various events, and on the state of various signals.

5. The apparatus of claim 1 wherein:

data signal lines connect said first device to said second device; and said second handshaking signal is determined based on the state of various events, and on the state of various signals.

6. The apparatus of claim 1 wherein said first and second devices comprise peer devices.

7. A method of controlling power management comprising:

providing a first device having a controller that controls power management protocols for said first device, said first devices's power management protocols comprising at least one reduced power state;

generating a first handshaking signal;

providing no more than one handshaking signal line for carrying said first handshaking signal from said first device;

said first handshaking signal, when generated at a predetermined time, commanding a second device to come out of its at least one reduced power state; and said same first handshaking signal, when generated at another predetermined time, informing said second device that said first device is out of its at least one reduced power state.

8. The method of claim 7 further comprising the steps of:

providing said second device having a controller that controls power management protocols for said second device, said second device's power management protocols comprising said at least one reduced power state;

generating a second handshaking signal;

providing no more than one handshaking signal line carrying said second handshaking signal from said second device;

said second handshaking signal, when received by said first device as part of a predetermined sequence, commanding said first device to come out of its at least one reduced power state; and said second handshaking signal, when received by said first device as part of another predetermined sequence, informing said first device that said second device is out of its reduced power state.

9. The method of claim 8 further comprising the steps of:

providing data signal lines connecting said first device to said second device; and determining said first handshaking signal based on the state of various events, and on the state of various signals.

10. The method of claim 9 further comprising the step of determining said second handshaking signal based on the state of various events, and on the state of various signals.

11. The method of claim 7 further comprising the steps of:

providing data signal lines connecting said first device to said second device; and determining said second handshaking signal based on the state of various events, and on the state of various signals.

* * * * *